(12) United States Patent
Bouvatier

(10) Patent No.: US 8,819,997 B2
(45) Date of Patent: Sep. 2, 2014

(54) FASTENING DEVICE

(71) Applicant: Dr. Ing. h.c.F. Porsche Aktiengesellschaft, Stuttgart (DE)

(72) Inventor: Christophe Bouvatier, Stuttgart-Weilimdorf (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/875,398

(22) Filed: May 2, 2013

(65) Prior Publication Data

US 2013/0292966 A1   Nov. 7, 2013

(30) Foreign Application Priority Data

May 2, 2012   (DE) .......................... 10 2012 103 833

(51) Int. Cl.
*F16B 2/22* (2006.01)
*B60R 13/02* (2006.01)

(52) U.S. Cl.
USPC ............................................ 49/492.1; 49/440

(58) Field of Classification Search
USPC ................... 49/475.1, 440, 441, 492.1, 493.1
See application file for complete search history.

(56) References Cited

U.S. PATENT DOCUMENTS

| 3,742,649 | A | * | 7/1973 | Dochnahl | 49/441 |
|---|---|---|---|---|---|
| 4,649,668 | A | * | 3/1987 | Skillen et al. | 49/374 |
| 4,949,507 | A | * | 8/1990 | Vaughan | 49/482.1 |
| 5,168,668 | A | * | 12/1992 | Mishima et al. | 49/440 |
| 5,433,038 | A | * | 7/1995 | Dupuy | 49/377 |
| 5,519,968 | A | * | 5/1996 | Dupuy | 49/489.1 |
| 5,618,593 | A | * | 4/1997 | Belser et al. | 428/31 |
| 5,743,047 | A | * | 4/1998 | Bonne et al. | 49/490.1 |
| 5,799,442 | A | * | 9/1998 | Takahashi et al. | 49/377 |
| 6,282,840 | B1 | * | 9/2001 | Vance | 49/377 |
| 6,409,251 | B1 | * | 6/2002 | Kaye et al. | 296/146.9 |
| 6,409,256 | B1 | * | 6/2002 | Page | 296/203.03 |
| 6,679,003 | B2 | * | 1/2004 | Nozaki et al. | 49/441 |
| 6,681,526 | B2 | * | 1/2004 | Mueller et al. | 49/440 |
| 6,742,304 | B1 | * | 6/2004 | Mueller et al. | 49/377 |
| 7,052,021 | B2 | * | 5/2006 | Plottnik | 277/642 |
| 7,171,785 | B1 | * | 2/2007 | Kelly et al. | 49/377 |
| 7,478,863 | B2 | * | 1/2009 | Krause | 296/146.2 |
| 7,484,287 | B2 | * | 2/2009 | Tamura | 29/451 |
| 7,565,771 | B2 | * | 7/2009 | Brocke | 49/377 |
| 7,900,993 | B2 | * | 3/2011 | Suzuki et al. | 296/146.5 |
| 7,934,341 | B2 | * | 5/2011 | Knight et al. | 49/377 |
| 8,001,727 | B2 | * | 8/2011 | Ho et al. | 49/377 |
| 8,151,521 | B2 | * | 4/2012 | Iwabuchi | 49/502 |
| 8,166,708 | B2 | * | 5/2012 | Ellis et al. | 49/490.1 |
| 8,181,397 | B2 | * | 5/2012 | Daio et al. | 49/492.1 |

(Continued)

FOREIGN PATENT DOCUMENTS

DE     297 08 654     9/1997

*Primary Examiner* — Katherine Mitchell
*Assistant Examiner* — Justin Rephann
(74) *Attorney, Agent, or Firm* — Gerald E. Hespos; Michael J. Porco; Matthew T. Hespos

(57) ABSTRACT

A fastening device is provided for attaching an exterior trim strip (1) to a carrying structure. In order to simplify attachment of the exterior trim strip to the carrying structure, the fastening device has latching or clipping-connection elements (21-24), which are latched or clipped to an interior trim strip (33) for fastening the exterior trim strip (1) on the interior trim strip (33).

10 Claims, 2 Drawing Sheets

(56) References Cited

U.S. PATENT DOCUMENTS

| | | | |
|---|---|---|---|
| 8,205,389 B1 * | 6/2012 | Kesh | 49/440 |
| 8,302,350 B2 * | 11/2012 | Lee et al. | 49/475.1 |
| 8,371,069 B2 * | 2/2013 | O'Sullivan et al. | 49/492.1 |
| 8,549,790 B2 * | 10/2013 | Murree et al. | 49/377 |
| 2011/0061307 A1 * | 3/2011 | Braeuherr | 49/475.1 |
| 2013/0031842 A1 * | 2/2013 | Murree et al. | 49/492.1 |
| 2013/0111821 A1 * | 5/2013 | Suzuki | 49/483.1 |
| 2013/0152472 A1 * | 6/2013 | Zimmer et al. | 49/26 |

* cited by examiner

FASTENING DEVICE

CROSS REFERENCE TO RELATED APPLICATION

This application claims priority under 35 USC 119 to German Patent Appl. No. 10 2012 103 833.3 filed on May 2, 2012, the entire disclosure of which is incorporated herein by reference.

BACKGROUND OF THE INVENTION

1. Field of the Invention

The invention relates to a fastening device for attaching an exterior trim strip to a carrying structure.

2. Description of the Related Art

German Utility Model DE 297 08 654 U1 discloses a cover strip for motor vehicles, for surrounding window cutouts. The cover strip includes a retaining rail and a functional rail. The retaining rail is secured on a bodywork and the functional rail can be pushed into the retaining rail for making a mutual form-fitting connection. A fastening strip is arranged on the retaining rail and can be secured on the visible and/or functional rail.

It is an object of the invention to simplify attachment of an exterior trim strip to a carrying structure.

SUMMARY OF THE INVENTION

The invention relates to a fastening device for attaching an exterior trim strip to a carrying structure. The fastening device comprises latching or clipping-connection elements that are latched or clipped to an interior trim strip so that the exterior trim strip to be fastened on the interior trim strip. The exterior trim strip and the interior trim strip preferably are part of a door of a motor vehicle, in particular to a rear door of the motor vehicle. The two trim strips preferably surround a window opening that can be closed by a door window. The latching or clipping-connection elements make it possible to dispense with additional fastening means for attaching the exterior trim strip to the carrying structure. The fastening device of the invention preferably attaches the exterior trim strip to the interior trim strip in an upper, front region of the vehicle door. The terms upper, front and rear relate to a motor vehicle that is equipped with the fastening device of the invention.

The latching or clipping-connection elements preferably are configured as curved latching or clipping fingers or latching hooks. The latching or clipping-connection elements may each comprise a latching or clipping finger or latching hook. However, it is preferable for the latching or clipping-connection elements to comprise a plurality of latching or clipping fingers or latching hooks.

The curved latching or clipping fingers or latching hooks preferably have their free ends engaging behind a fastening bead that is formed on the interior trim strip. The fastening bead, as seen in cross section preferably is formed at a free end of a limb of the interior trim strip. The interior trim strip preferably comprises a plurality of limbs, of which at least one is arranged on the inside in the visible region of the motor vehicle. The limb of the interior trim strip with the fastening bead advantageously extends in the direction of the exterior trim strip.

The latching or clipping-connection elements preferably extend from a latching or clipping strip that is fastened on the exterior trim strip. The latching or clipping strip preferably comprises plurality, for example four, latching or clipping-connection elements, each of which has plural, for example three, latching or clipping fingers or latching hooks. The latching or clipping strip with the latching or clipping-connection elements preferably is formed from a material different from the material that is used for the exterior trim strip and/or the interior trim strip.

The latching or clipping strip preferably is connected integrally to the exterior trim strip. The latching or clipping strip preferably is bonded adhesively to the exterior trim strip so that the latching or clipping strip can be fastened stably on the exterior trim strip.

The latching or clipping strip with the latching or clipping-connection elements preferably is formed from plastic. This considerably simplifies the production of the latching or clipping strip with the latching or clipping-connection elements. Furthermore, a suitable plastic can be used to readily realize a certain degree of elasticity, in particular elastic deformability, of the latching or clipping-connection elements. The plastic is, for example, a polyamide material reinforced with glass fibers.

The exterior trim strip preferably is formed from light metal, such as an aluminum material. Lugs may be formed on the exterior trim strip, in portions in which there are no latching or clipping-connection elements. The lugs make it possible for the exterior trim strip to be screwed to the carrying structure. The exterior trim strip preferably has, on the outside, at least one visible region that comprises, for example, at least one light edge. The latching or clipping strip with the latching or clipping-connection elements thus advantageously is fastened on the inside of the exterior trim strip.

The exterior trim strip may have an essentially U-shaped cross section with a base that constitutes a visible region on the outside. The visible region may have a light edge. The latching or clipping strip with the latching or clipping-connection elements may advantageously be fastened on the inside of the base of the exterior trim strip.

A long limb preferably is angled from the base of the exterior trim strip and covers over the latching or clipping-connection elements to ensure that the latching or clipping-connection elements cannot be seen from the outside.

A short limb is angled from the base of the exterior trim strip and extends toward a window. The short limb improves the overall visual impression of the fitted exterior trim strip.

The interior trim strip preferably is an extruded profile. The interior trim strip may be configured from the same material as the exterior trim strip. An extruded profile has the advantage that a fastening bead readily can be formed on the interior trim strip. The fastening bead makes it easier to realize the latching or clipping connection.

The invention also relates to an exterior trim strip, an interior trim strip and/or a latching or clipping strip of a fastening device described above. The exterior trim strip, the interior trim strip and/or the latching or clipping strip can be handled separately.

Further advantages, features and details of the invention can be gathered from the following description, in which exemplary embodiments are described with reference to the drawings.

DETAILED DESCRIPTION OF THE PREFERRED EMBODIMENTS

Figure 1:
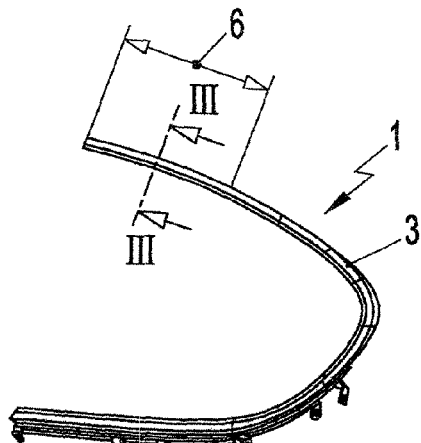
FIG. 1 is a perspective view of an exterior trim strip according to the invention.

FIG. 1 is a perspective illustration of an exterior trim strip 1 of a motor vehicle. The exterior trim strip 1 is formed from aluminum. Fastening lugs 4 are fit on a basic strip body 3 of the exterior trim strip 1.

The fastening lugs 4 may be formed on the basic strip body 3 and may function to fasten the exterior trim strip 1 on a suitable carrying structure. Fastening of the exterior trim strip 1 on the carrying structure using the fastening lugs 4 advantageously can be carried out with the screws that are screwed into the carrying structure through the fastening lugs 4.

The fastening lugs 4 are not provided throughout the exterior trim strip 1, and a double arrow 6 indicates a region in which there are no fastening lugs on the exterior trim strip 1. Fastening the exterior trim strip 1 on the carrying structure takes place differently in the region 6 than is the case in conventional systems.

The exterior trim strip 1 is fastened on an interior trim strip (not illustrated in FIG. 1) in the region 6. The exterior trim strip 1 and the interior trim strip are assigned to a window opening in a rear door of the motor vehicle. The exterior trim strip 1 has the region 6 arranged in an upper, front region of the rear door of the motor vehicle.

Figure 2:
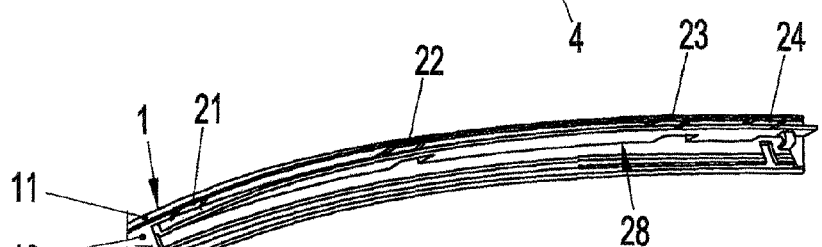
FIG. 2 shows a region of the exterior trim strip from FIG. 1 with latching or clipping-connection elements.

The region 6 of the exterior trim strip 1 is visible from the outside in FIG. 1, and FIG. 2 shows this region in perspective view from the inside. It can be seen in FIG. 2 that the basic strip body 3 has an essentially U-shaped cross section with a base 10 from which first and second limbs 11 and 12 are angled inward.

The first limb 11 is longer than the second limb 12, and therefore also is referred to as long limb 11. Analogously, the limb 12 is referred to as short limb 12.

Latching or clipping-connection elements 21, 22, 23, 24 are fastened on the inside of the base 10 of the exterior trim strip 1. The latching or clipping-connection elements 21 to 24 are joined unitarily to a latching or clipping strip 28. The latching or clipping strip 28 with the latching or clipping-connection elements 21 to 24 is an elastically flexible material.

In the illustrated embodiment, the latching or clipping strip 28 with the latching or clipping-connection elements 21 to 24 is formed from a glass-fiber-reinforced polyamide designated PA66GF30. The latching or clipping strip 28 is configured, for example, as a thin-walled injection molding and is adhesively bonded, in certain regions, to the base 10 of the exterior trim strip 1.

The latching or clipping-connection elements 21 to 24 each comprise a plurality of latching or clipping fingers hooks. The latching or clipping fingers or hooks are angled from the latching or clipping strip 28 and are curved configuration.

Figure 3:
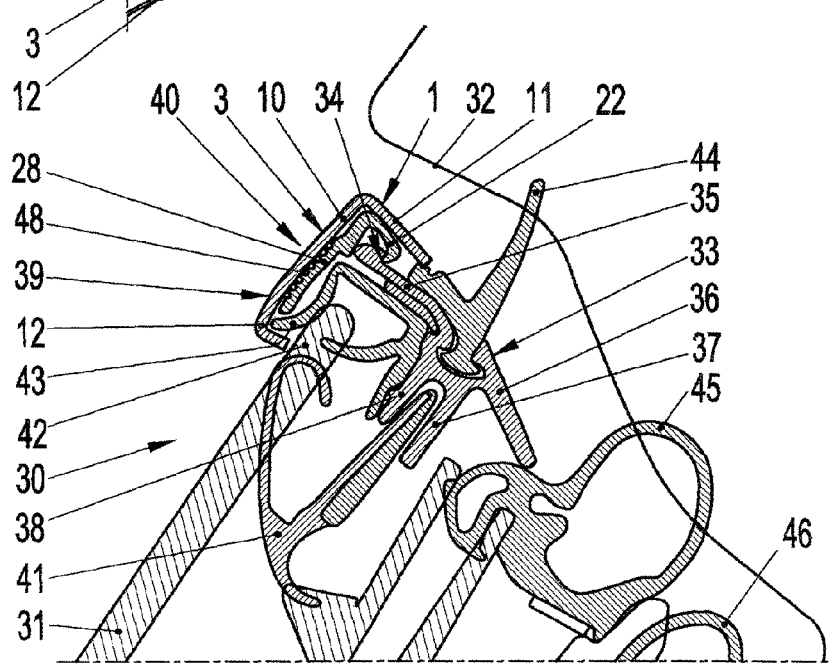
FIG. 3 is a cross-sectional view taken along line III-III in FIG. 1.
Figure 4:
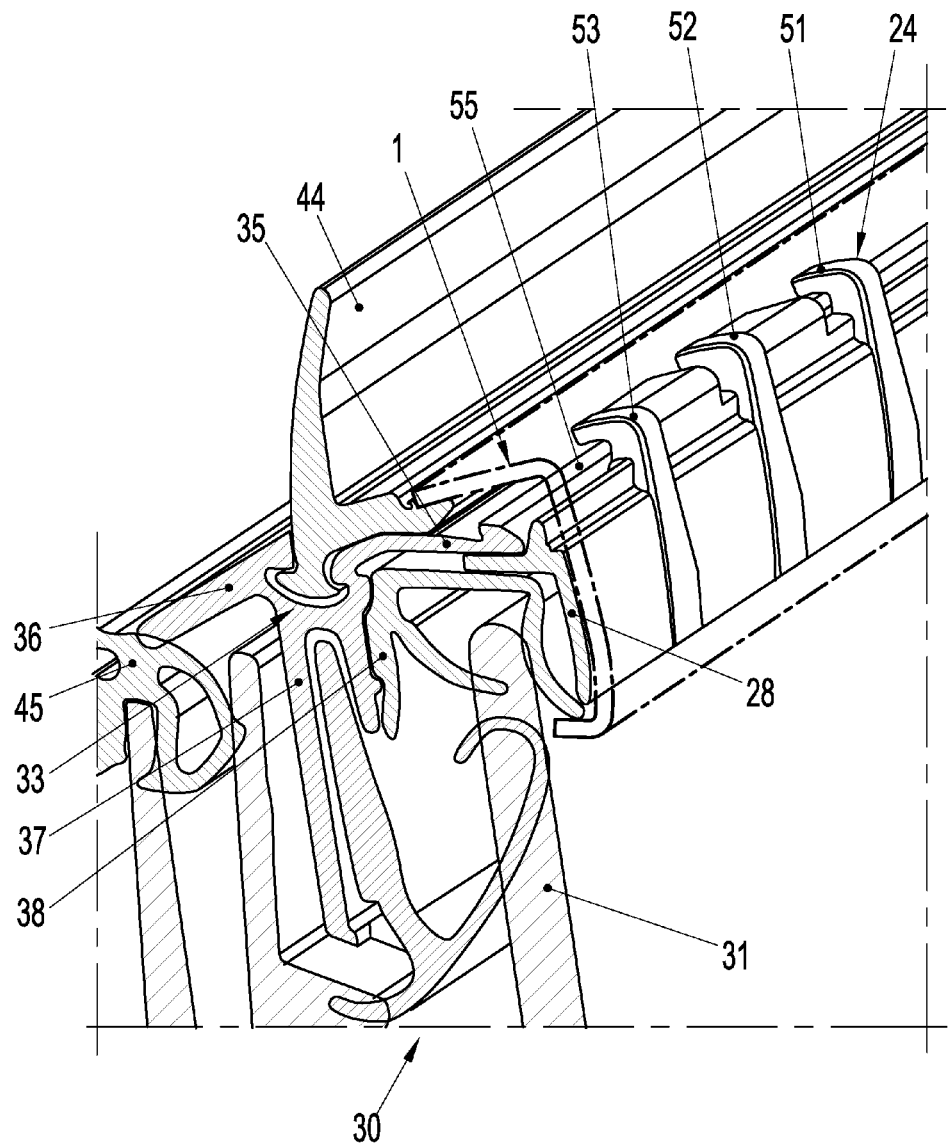
FIG. 4 is a perspective illustration of the section from FIG. 3.

FIGS. 3 and 4 illustrate different sectional views of a vehicle door 30 with a door window 31. The vehicle door 30 is a rear door of a motor vehicle. FIG. 3 indicates a contour 32 of a door opening in an upper, front region. The exterior trim strip 1, which is illustrated on its own in FIG. 1, is fastened on an interior trim strip 33 of the vehicle door 30 in the region 6 with the aid of the latching or clipping strip 28.

As shown in FIG. 3, the exterior trim strip 1 is fastened on the interior trim strip 33 with the aid of one of a number of clipping mechanisms 34. The clipping mechanism 34 is realized by the latching or clipping-connection element 22, which is configured as a latching hook and extends from the latching or clipping strip 28 and is hooked to a limb 35 of the interior trim strip 33.

The interior trim strip 33 comprises, as seen in cross section, a total of four limbs 35, 36, 37 and 38. The limb 35 extends, essentially perpendicularly to the door window 31, in the direction of the exterior trim strip 1. The two limbs 37 and 38 are arranged essentially parallel to the door window 31. The limb 36 is directed toward the interior of the motor vehicle. The limb 36 of the interior trim strip 33 here extends approximately at an angle of 60 degrees to the door window 31.

The latching or clipping strip 28 is fastened on the inside of the base 10 of the exterior trim strip 1. Spots 48 are used to indicate that the latching or clipping strip 28 is bonded adhesively to the base 10 of the exterior trim strip 1. The base 10 of the exterior trim strip 1 runs essentially parallel to the door window 31. A light edge 39 is arranged in a visible region 40 on the outside of the base 10 of the exterior trim strip 1.

Six connection parts 41, 42, 43, 44, 45, 46 also can be seen in the detail of the vehicle door 30 illustrated in FIG. 3. The connection parts 41 to 46 are predominantly sealing elements, which end up butting with sealing action against the door window 31 or against the contour 32 of the door opening.

The connection parts 41 to 46 are fastened on the interior trim strip 33 or on a further carrying structure of the motor-vehicle door 30. The interior trim strip 33 may itself be designed as a carrying structure of the motor-vehicle door 30. However, it is also possible for the interior trim strip 33 to be fastened on a further carrying structure of the vehicle door 30.

FIG. 4 shows that the latching or clipping-connection element 24 comprises a total of three latching or clipping fingers 51, 52, 53 that extend from the latching or clipping strip 28. The latching or clipping fingers 51 to 53 are configured as curved latching hooks that engage behind a fastening bead 55. The fastening bead 55 is formed at a free end of the limb 35 of the interior trim strip 33. The fastening bead 55 constitutes a nose that interacts with the latching hooks 51 to 53 to define the clipping mechanism 34.

The exterior trim strip 1 is indicated merely as a cross section in FIG. 4 so that the latching or clipping strip 28 concealed beneath the exterior trim strip 1 can be seen. This illustration shows that the long limb of the exterior trim strip 1 engages over the latching or clipping fingers 51 to 53 so that the latching or clipping fingers 51 to 53 are concealed and cannot be seen from the outside.

What is claimed is:

1. A trim assembly for a window opening of a vehicle door, comprising:

an interior trim strip attached to the vehicle door, the interior trim strip having a limb extending out on the door toward a plane of the window opening, the limb having an upwardly projecting fastening bead having a tapered leading end and a locking surface facing opposite to a projecting direction of the limb;

an exterior trim strip on a side of the vehicle door external of the interior trim strip, the exterior trim strip defining a substantially U-shaped channel with a base and upper and lower limbs projecting from opposite sides of the base and toward the interior trim strip;

a latching strip fastened on a side of the base of the exterior trim strip facing toward the interior trim strip and positioned entirely between the upper and lower limbs, the latching strip including connection elements disposed adjacent a lower side of the upper limb and projecting toward the interior trim strip a distance less than a projecting distance of the upper limb so that the latching strip is concealed entirely by the exterior trim part when viewed from an exterior of the door and the connection elements being clipped to the fastening bead of the interior trim strip for fastening the exterior trim strip to the interior trim strip.

2. The fastening device of claim 1, wherein the latching strip is connected integrally to the exterior trim strip.

3. The fastening device of claim 1, wherein the upper limb of the exterior trim strip has a projecting length greater than a projecting length of the lower limb.

4. The fastening device of claim 1, wherein the interior trim strip is an extruded profile.

5. The trim assembly of claim 1, wherein the connection elements are curved latching hooks.

6. The trim assembly of claim 1, wherein the latching strip is formed from plastic.

7. The trim assembly of claim 1, wherein the exterior trim strip is formed from aluminum.

8. The trim assembly of claim 7, wherein the base of the exterior trim strip is in a position on the vehicle that is visible from outside the vehicle.

9. The trim assembly of claim 1, wherein the lower limb of the exterior trim strip is angled from the base of the exterior trim strip and extends toward a window.

10. The trim assembly of claim 1, further comprising a seal mounted to the interior trim part for sealing inner and outer surfaces of an upper part of a window of the door, parts of the seal that are disposed to engage the outer surface of the window being between the upper and lower limbs of the exterior trim part and not visible from outside the vehicle.

\* \* \* \* \*